United States Patent
Baker et al.

(10) Patent No.: US 7,733,914 B2
(45) Date of Patent: Jun. 8, 2010

(54) METHOD OF, AND SYSTEM FOR, COMMUNICATING DATA, AND A STATION FOR TRANSMITTING DATA

(75) Inventors: Matthew P. J. Baker, Canterbury (GB); Timothy J. Moulsley, Caterham (GB); Paul Bucknell, Brighton (GB); Olivier J-M. Hus, Redhill (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 345 days.

(21) Appl. No.: 11/570,548

(22) PCT Filed: Jun. 22, 2005

(86) PCT No.: PCT/IB2005/052042

§ 371 (c)(1),
(2), (4) Date: Dec. 13, 2006

(87) PCT Pub. No.: WO2006/000991

PCT Pub. Date: Jan. 5, 2006

(65) Prior Publication Data

US 2008/0267190 A1    Oct. 30, 2008

(30) Foreign Application Priority Data

Jun. 23, 2004    (GB)    .................................. 0414057.0

(51) Int. Cl.
*H04J 3/24*    (2006.01)
(52) U.S. Cl. ........................ 370/474; 714/748; 714/749
(58) Field of Classification Search .................. 370/474, 370/394; 714/748, 749
See application file for complete search history.

(56) References Cited

U.S. PATENT DOCUMENTS 5,309,435 A * 5/1994 Hirome ...................... 370/244

(Continued)

FOREIGN PATENT DOCUMENTS

EP    0494036 A2    7/1992

(Continued)

OTHER PUBLICATIONS

Written Opinion of the International Searching Authority PCT/IB2005/052042.

(Continued)

*Primary Examiner*—Huy D Vu
*Assistant Examiner*—Omer Mian (57)    ABSTRACT

Data is transmitted from a first station to a second station, by following method: at the first station, dividing the data into a sequence of data packets and transmitting the sequence of data packets; at the second station, receiving the data packets and transmitting acknowledgements indicating whether the data packets have been received successfully; at the first station, retransmitting as a sub-sequence of a plurality of sub-packets a data packet which has not been received successfully; and at the second station, reconstituting the data from the data packets and sub-packets; wherein the data packets comprise a sequence number providing an indication of position of each data packet within the sequence of data packets, and the sub-packets comprise a sub-packet indicator providing an indication of position of each sub-packet within the sub-sequence of sub-packets, and wherein the sequence numbers and sub-packet indicators include a plurality of numbers in common.

12 Claims, 7 Drawing Sheets

U.S. PATENT DOCUMENTS

| | | |
|---|---|---|
| 6,389,016 B1 | 5/2002 | Sabaa et al. |
| 6,519,731 B1 | 2/2003 | Huang et al. |
| 6,744,765 B1 | 6/2004 | Darth et al. |
| 7,346,037 B2 * | 3/2008 | Yun et al. .................. 370/335 |
| 2002/0143988 A1 | 10/2002 | Jensen |
| 2003/0097629 A1 | 5/2003 | Moon et al. |
| 2003/0110435 A1 * | 6/2003 | Wu et al. .................... 714/748 |
| 2005/0010759 A1 * | 1/2005 | Wakiyama ................. 713/160 |

FOREIGN PATENT DOCUMENTS

| | | |
|---|---|---|
| WO | 0228017 A2 | 4/2002 |
| WO | 02069549 A1 | 9/2002 |
| WO | 2004043017 A2 | 5/2004 |

OTHER PUBLICATIONS

ISR, International Search Report WO2006/000991 A1.

* cited by examiner

Packets and sub-packets received:

Packets and sub-packets after re-ordering by second station:

FIG. 7

Packets and sub-packets received:

Packets and sub-packets after re-ordering by second station:

METHOD OF, AND SYSTEM FOR, COMMUNICATING DATA, AND A STATION FOR TRANSMITTING DATA

The invention relates to a method of communicating data, to a system for communicating data, and to a station for transmitting data. The invention has application in, for example but not exclusively, mobile communications systems such as the Universal Mobile Telecommunication System (UMTS) and the CDMA2000 system. It may be used for uplink (mobile station to base station) communication or downlink (base station to mobile station) communication of data.

According to the current UMTS specifications, available at www.3gpp.org, data to be transmitted from a first station to a second station is divided into packets. Each packet may include parity bits to enable the second station to detect or correct errors occurring during transmission.

At the physical layer of a protocol stack, an ARQ or Hybrid ARQ (HARQ) protocol may be operated, whereby the second station indicates correct or incorrect reception of each packet by transmission of a positive or negative acknowledgement respectively. In some cases either negative acknowledgements or positive acknowledgements are not transmitted. If a packet is not received correctly, it may be retransmitted up to a predetermined number of times. The initial transmissions and retransmissions of a packet are combined at the physical layer of the second station, before passing correctly received packets up to the MAC (Medium Access Control) layer. A New Data Indicator (NDI) at the physical layer tells the second station whether a received packet is the first transmission of a new packet or a retransmission of an earlier packet which should be combined with the previously-received transmissions of that packet.

After the first station has transmitted a packet, there will be some delay before the first station receives the indication of whether the packet was received correctly. If the first station is unable to start transmitting the next packet until the indication has been received, the total rate of data transmission will be reduced. Therefore the first station is typically allowed to transmit further packets while waiting for the indication of correct reception of the first packet. Each packet transmitted during this period is said to use a different "HARQ channel" or "HARQ process". Each HARQ process is typically identified by a HARQ Process Identifier which is signalled with the packet. The retransmissions for a given packet always occur on the same HARQ process as the initial transmission of the packet.

At the MAC layer, each packet carries a header which contains a sequence number (SN) which enables the second station to re-order the packets into the correct order. The re-ordering is carried out by the MAC layer of the second station, prior to passing the packets to a higher layer in the protocol stack. In this case, each packet comprises a MAC Protocol Data Unit (PDU).

Figure 1:
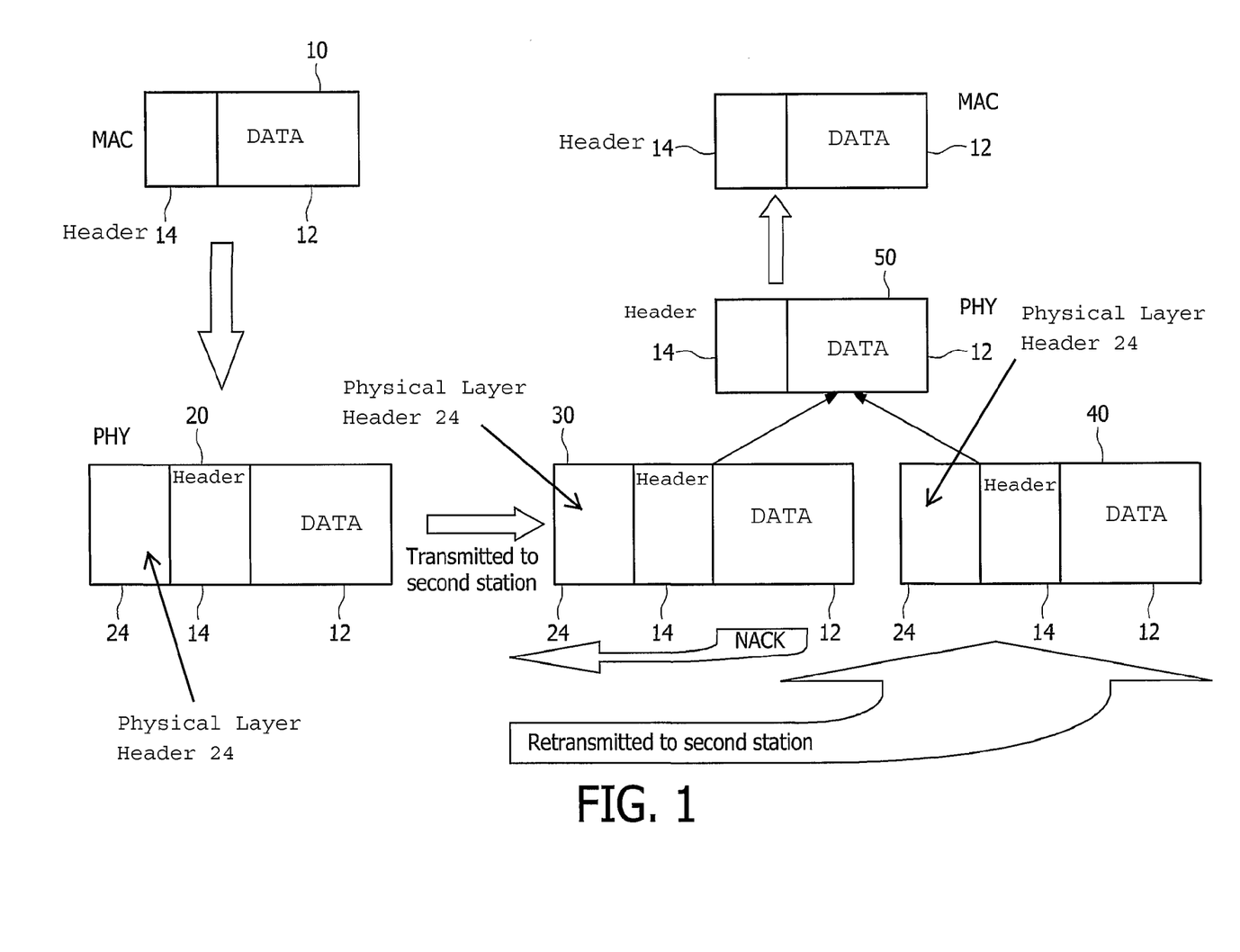
FIG. 1 is a diagrammatic representation of a Hybrid ARQ protocol.

The HARQ protocol described above is illustrated diagrammatically in FIG. 1. The diagram is arranged into steps on the left side performed by the first station which is sending the data, and steps on the right side performed by the second station which is receiving the data. The diagram is also arranged in an upper MAC layer and a lower physical layer. The MAC layer of the first station receives data from a higher layer and generates a plurality of MAC packets 10. For clarity, only one MAC packet 10 is illustrated in FIG. 1. The MAC packet 10 comprises data 12, which is a portion of the higher layer data, and a MAC header 14 which includes a sequence number SN. The MAC packet 10 is passed down to the physical (PHY) layer where a physical layer packet 20 is constructed by adding a physical layer header 24 to the MAC packet 10. The physical layer header 24 includes the NDI and a HARQ Process Identifier. The first station transmits the physical layer packet 20 to the second station. If the second station is unable to fully recover the data in the received data packet 30 due to errors in transmission, it transmits a negative acknowledgement (NACK) to the first station, in response to which the first station retransmits the physical layer packet 20. The second station deletes the physical layer header 24 and may combines different received versions 30, 40 of the same physical layer packet to derive an error free version 50 which is then passed up to the MAC layer of the second station. The MAC layer uses the sequence numbers SN to re-order received packets as necessary to reconstitute the original order of the data from the higher layer.

Figure 2:
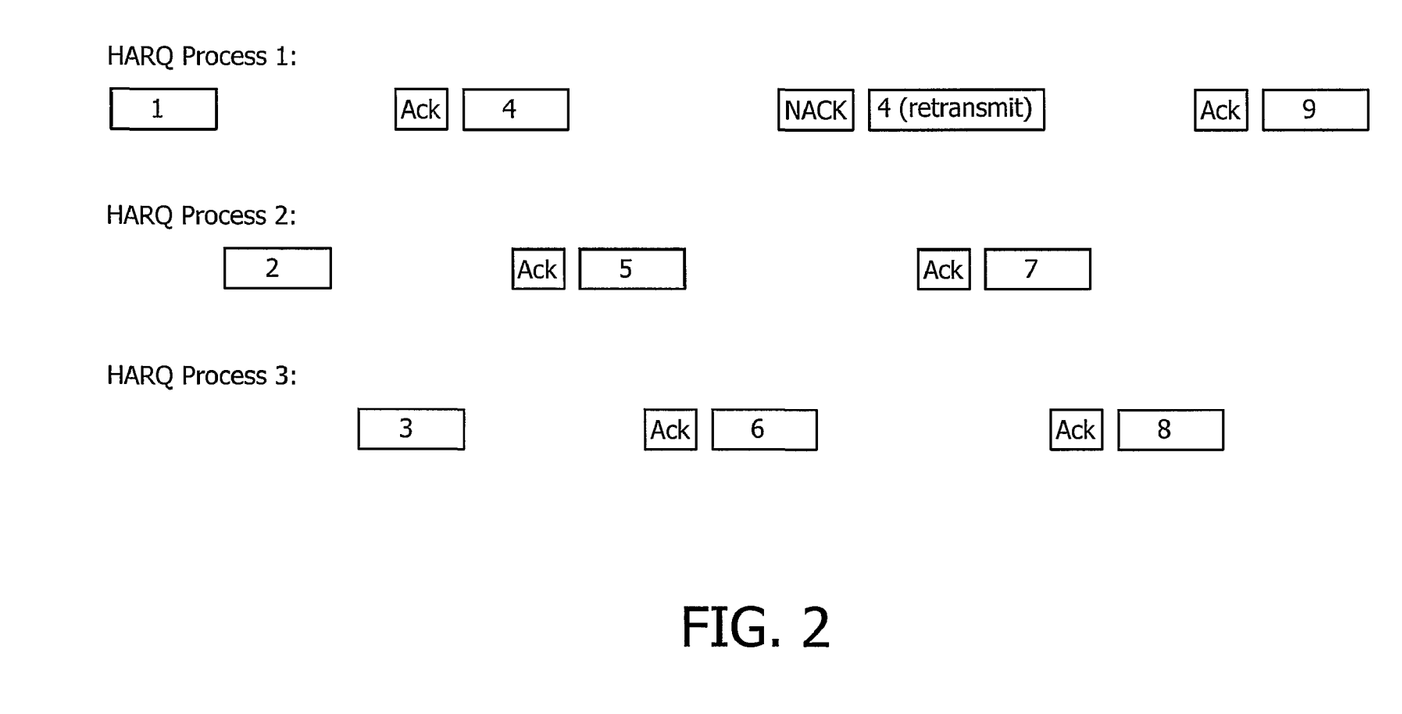
FIG. 2 is illustrates the re-ordering of data packets transmitted with different HARQ processes.

The re-ordering of packets received in the MAC layer from different HARQ processes is illustrated in FIG. 2. Packet 1 is transmitted by the first station using HARQ Process 1. As HARQ Process 1 is then busy waiting for an acknowledgement, packet 2 is transmitted using HARQ Process 2. Similarly packet 3 is transmitted using HARQ Process 3. Before packet 4 is transmitted, a positive acknowledgement ACK is received by HARQ Process 1, indicating that packet 1 was received successfully by the second station. Therefore HARQ Process 1 is available to transmit packet 4. Similarly, positive acknowledgements received on HARQ Processes 2 and 3 enable packets 5 and 6 to be transmitted on these respective HARQ Processes.

HARQ Process 1 receives a negative acknowledgement NACK after transmitting packet 4, indicating that packet 4 has not been received successfully by the second station. Therefore, HARQ Process 1 retransmits packet 4, and so packets 7 and 8 are transmitted on available HARQ Processes 2 and 3.

It can be seen in FIG. 2 that the order in which the second station finally receives the correct data packets is 1, 2, 3, 5, 6, 4, 7, 8. The second station uses the sequence number SN to re-order the packets, holding packets 5 and 6 in a buffer until packet 4 is correctly received.

Sometimes the first station will retransmit a packet unnecessarily, for example if a positive acknowledgement transmitted by the second station is corrupted and received by the first station as a negative acknowledgement. In the example of FIG. 2, the negative acknowledgement NACK received by the first station after the transmission of packet 4 might in fact have been a positive acknowledgement transmitted by the second station. In this case, the packets received by the second station would be 1, 2, 3, 4, 5, 6, 4, 7, 8. Therefore the second station would normally discard any packet which appeared from the SN to be a duplicate of one which had already been successfully received.

If a packet is not correctly received (e.g. as determined by a cyclic redundancy check) by the second station after the maximum number of retransmissions (which may be zero), the data may be lost, or alternatively a higher layer in the protocol stack of the second station may attempt to initiate a retransmission. However, such higher-layer retransmissions are typically slow and may cause unacceptable delay. Further, higher-layer retransmissions typically involve retransmitting the whole of a higher-layer PDU, which may comprise a plurality of MAC PDUs; in this case the loss of one MAC PDU may cause the loss of a whole higher-layer PDU, and if retransmission of the higher-layer PDU is attempted a larger amount of transmitted energy will be required and a larger amount of interference generated than if only the MAC PDU was retransmitted.

A known solution disclosed in WO 2004/043017 for reducing the amount of retransmission is to retransmit only a portion, for example one quarter, of the data contained in the original packet. In the present specification, such a packet containing only a portion of the data contained in the original packet is termed a sub-packet. According to WO 2004/043017, a sub-packet uses the sequence number from the original packet, which enables the second station to insert the portion of data in the correct position in the sequence of received packets.

The first station may transmit the sub-packet after a predetermined number of failed attempts to transmit the original packet. By selecting only a portion of the original data for retransmission, the probability of successful reception of the data may be increased. Typically, more robust coding or modulation schemes may be used for the sub-packet.

In parallel with, or interspersed between, the attempts to transmit an original packet and the sub-packet, the first station may transmit other, new packets using sequence numbers incremented relative to the sequence numbers used for the original packet and the sub-packet.

A limitation of this known solution is manifest if the amount of data to be retransmitted exceeds the amount of data that can be accommodated reliably in a single sub-packet. It is undesirable to enlarge the sub-packet, or revert to retransmitting the original data packet, as this will reduce the reliability of reception, resulting in more retransmissions, which tends to diminish the benefit of the sub-packet.

U.S. Pat. No. 6,519,731 B1 discloses a solution permitting a plurality of sub-packets to be used for retransmitting of the data contained in a packet. To assure the availability of sequence numbers for sub-packets without reusing packet numbers, the packet numbers are transmitted in increments of N+1, where N is the number of sub-packets available for retransmitting of the data contained in a packet. A disadvantage of this scheme is that a large numbering range is required to provide distinct sequence numbers for packets and sub-packets, resulting in an increased overhead in packets and sub-packets.

An object of the invention is to enable an improved retransmission protocol.

According to a first aspect of the invention there is provided a method of transmitting data from a first station to a second station, comprising:

at the first station, dividing the data into a sequence of data packets and transmitting the sequence of data packets;

at the second station, receiving the data packets and transmitting acknowledgements indicating whether the data packets have been received successfully;

at the first station, retransmitting as a sub-sequence of a plurality of sub-packets a data packet which has not been received successfully;

at the second station, reconstituting the data from the data packets and sub-packets;

wherein the data packets comprise a sequence number providing an indication of position of each data packet within the sequence of data packets, and the sub-packets comprise a sub-packet indicator providing an indication of position of each sub-packet within the sub-sequence of sub-packets, and wherein the sequence numbers and sub-packet indicators include a plurality of numbers in common.

According to a second aspect of the invention there is provided a first station for transmitting data to a second station, the first station comprising:

means for dividing the data into a sequence of data packets, each data packet including a sequence number providing an indication of position of the data packet within the sequence of data packets;

means for transmitting each data packet in turn;

means for receiving an acknowledgement from the second station indicating whether the transmitted data packet has been received successfully;

means responsive to receiving an acknowledgement indicating that the transmitted data packet has not been received successfully, for dividing the unsuccessful data packet into a sub-sequence of sub-packets, each sub-packet including a sub-packet indicator providing an indication of position of the sub-packet within the sub-sequence, wherein the sequence numbers and the sub-packet indicators include a plurality of numbers in common; and means for transmitting each sub-packet in turn.

According to a third aspect of the invention there is provided a system for communicating data from a first station to a second station, the system comprising a first station in accordance with the second aspect of the invention and a second station having:

means for receiving the data packets and sub-packets;

means for decoding the received data packets and sub-packets;

means for generating acknowledgements indicative of whether the received data packets and sub-packets have been received successfully;

means for transmitting the acknowledgements; and means for employing the sequence numbers and sub-packet indicators to reconstitute the data.

By using a plurality of sub-packets, efficiency can be improved even when the amount of data to be retransmitted exceeds the amount that can be efficiently accommodated in a single sub-packet. The retransmission scheme disclosed in WO 2004/043017 cannot be readily adapted to provide a plurality of sub-packets for retransmissions because in WO 2004/043017 the sub-packet contains the same sequence number as the original data packet, and if a plurality of sub-packets were to be transmitted using that same sequence number, the second station would be unable to distinguish them and so be unable to correctly re-order the received sub-packets.

By including a sub-packet indicator in each sub-packet, the second station can distinguish the sub-packets and can correctly re-order the received sub-packets.

By re-using the packet sequence numbers for the sub-packet indicator a smaller numbering range is required than that disclosed in U.S. Pat. No. 6,519,731 B1, resulting in reduced packet overhead and improved efficiency.

In a first embodiment of the invention the sub-packet indicator comprises, in consecutive sub-packets, consecutive sequence numbers commencing with the sequence number of the data packet being retransmitted and followed by subsequent sequence numbers.

In another embodiment of the invention the sub-packet indicator comprises, in consecutive sub-packets, consecutive sequence numbers commencing with a sequence number having a predetermined negative offset from the sequence number of the data packet being retransmitted and followed by subsequent sequence numbers.

In another embodiment of the invention the sub-packet indicator comprises, in consecutive sub-packets, consecutive sequence numbers commencing with the sequence number of the packet being retransmitted and followed by preceding sequence numbers in reverse order of use compared with the sequence numbers in the data packets.

In another embodiment of the invention the sub-packet indicator comprises, in consecutive sub-packets, consecutive sequence numbers commencing with a sequence number having a predetermined negative offset from the sequence number of the packet being retransmitted and followed by sequence numbers preceding the offset sequence number in reverse order of use compared with the sequence numbers in the data packets.

In another embodiment of the invention the sub-packet indicator comprises, in consecutive sub-packets, consecutive sequence numbers in the same order as used in the data packets and terminating with the sequence number of the data packet being retransmitted.

In another embodiment of the invention the sub-packet indicator comprises, in consecutive sub-packets, consecutive sequence numbers in the same order as used in the data packets and terminating with a sequence number having a predetermined negative offset from the sequence number of the data packet being retransmitted.

In another embodiment of the invention the sub-packet indicator comprises, in the first sub-packet the sequence number of the data packet being retransmitted, and in following sub-packets, preceding sequence numbers in the same order of use as the sequence numbers in the data packets.

In another embodiment of the invention the sub-packet indicator comprises, in the first sub-packet a sequence number having a predetermined negative offset from the sequence number of the data packet being retransmitted, and in following sub-packets, sequence numbers preceding the offset sequence number in the same order of use as the sequence numbers in the data packets.

The sequence numbers typically, but not necessarily, have consecutive integer values; they may be a set of any numbers known to both the first station and the second station and used in a predetermined order. The sequence numbers are used cyclically, such that when all the sequence numbers have been used, they are used again in the same order. The term "consecutive sequence numbers" refers to successive numbers in the predetermined order, including cyclic re-use.

The invention will now be described, by way of example only, with reference to the accompanying drawings wherein.

Figure 3:
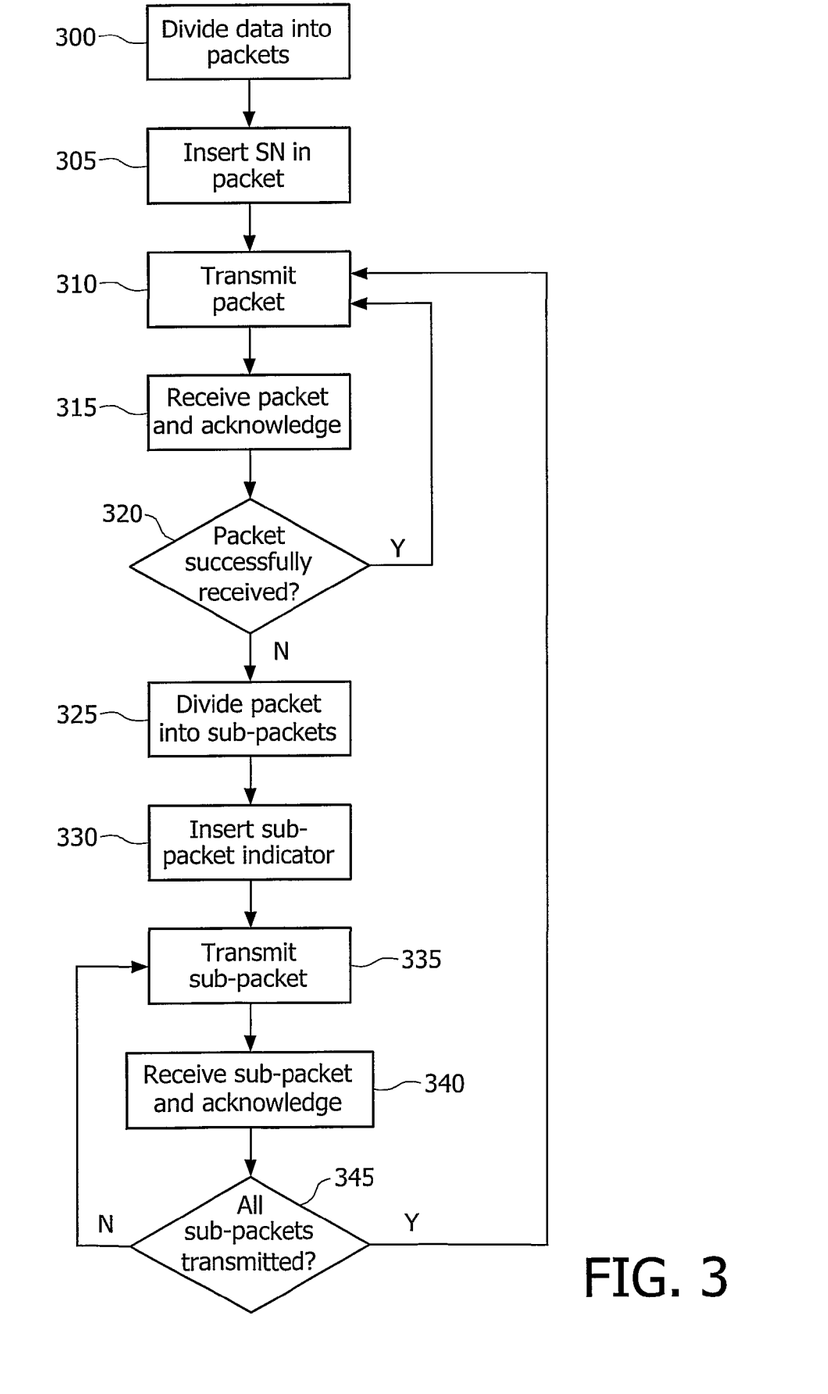
FIG. 3 is a flow chart of a method of communicating data in accordance with the invention.

FIG. 3 is a flow chart of a method of communicating data from a first station to a second station in accordance with the invention. The method commences at step 300 where data for transmission by the first station is divided into packets. At step 305 each packet has a sequence number inserted into it, and at step 310 the first packet is transmitted. At step 315 the transmitted packet is received by the second station and error correction performed if errors are present in the received packet. A positive acknowledgement is transmitted if the packet is received successfully, after error correction if appropriate, and a negative acknowledgement is transmitted if the packet cannot be successfully decoded.

At step 320, the first station determines from the received acknowledgements whether the packet has been received successfully by the second station. If it has, then flow reverts to step 310 where the next packet is transmitted.

If the packet has not been received successfully by the second station then optionally (not illustrated in FIG. 3) the packet may be retransmitted at step 310. Otherwise, flow proceeds to step 325 where the first station divides the unsuccessful packet into a plurality of sub-packets. At step 330 each sub-packet has a sub-packet indicator inserted into it, the sub-packet indicator being selected from a number set having a plurality of numbers in common with the number set of the sequence numbers, and at step 335 the first sub-packet is transmitted. At step 340 the transmitted sub-packet is received by the second station, error correction performed if errors are present in the received sub-packet, and the sub-packet is acknowledged. At step 345, the first station determines whether all of the sub-packets have been transmitted. If not, flow reverts to step 335 where the next sub-packet is transmitted. If all of the sub-packets have been transmitted, flow reverts to step 310 where the next packet is transmitted.

Figure 4:
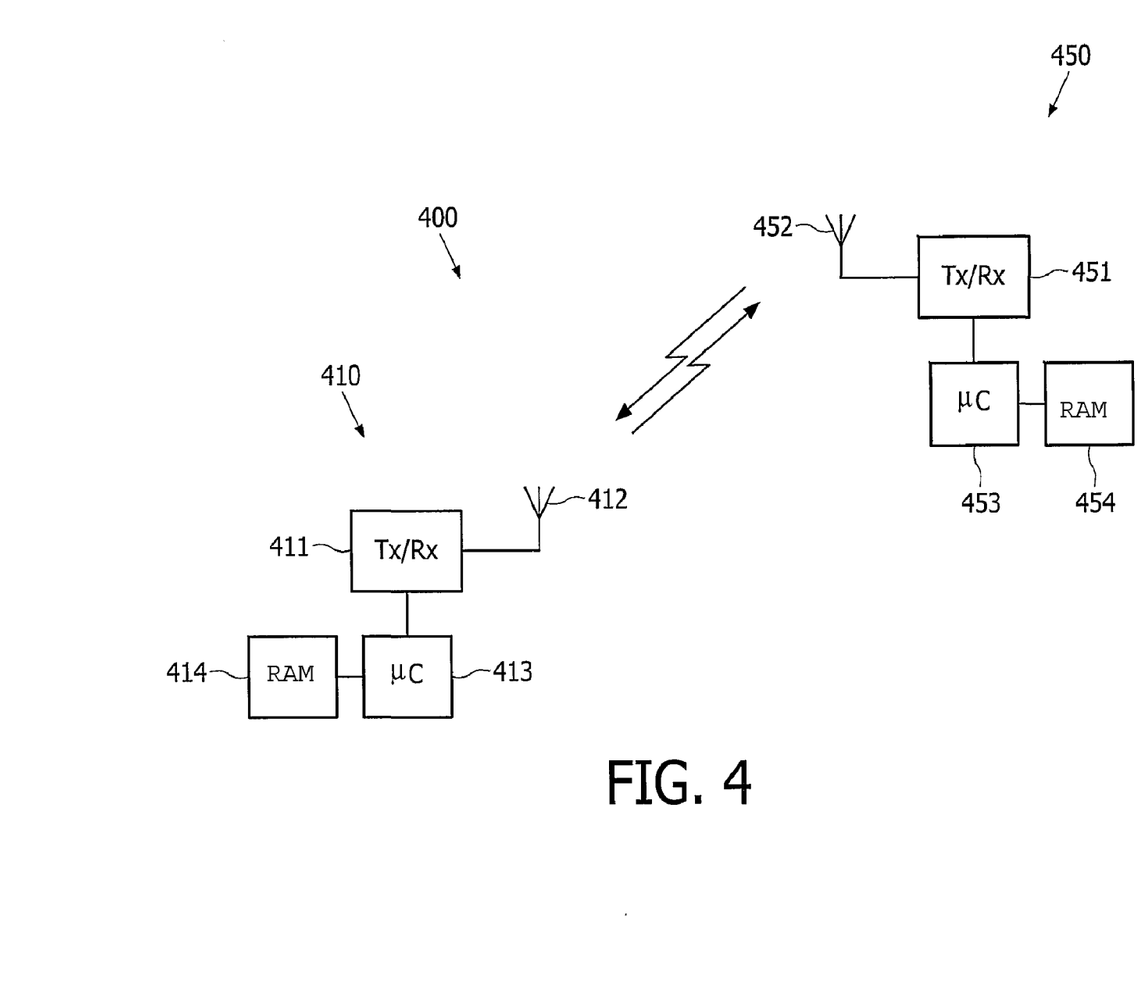
FIG. 4 is a schematic diagram of a system for communicating data in accordance with the invention.

FIG. 4 is a schematic diagram of a system 400 for communicating data from a first station 410 to a second station 450. The first station 410 comprises a transceiver 411 coupled to an antenna 412 for transmitting packets and sub-packets and for receiving acknowledgements from the second station 450. Coupled to the transceiver 411 is a processing means, such as a microcontroller, for constructing, from data that is to be communicated, packets and sub-packets for transmission, including inserting sequence numbers and sub-packet indicators, and for analysing acknowledgements received from the second station 450. Coupled to the processing means 413 is a storage means 414, such as a random access memory (RAM) for temporarily storing the packets and sub-packets in readiness for transmission or retransmission.

The second station 450 comprises a transceiver 451 coupled to an antenna 452 for receiving packets and sub-packets and for transmitting acknowledgements to the first station 410. Coupled to the transceiver 451 is a processing means 453, such as a microcontroller, for decoding received packets and sub-packets, generating acknowledgements for transmission, analysing the sequence numbers and sub-packet indicators, and for assembling the packets and sub-packets in the correct order to reconstitute the original data. Coupled to the processing means 453 is a storage means 454, such as a RAM, for storing the received packets and sub-packets.

Figure 5:
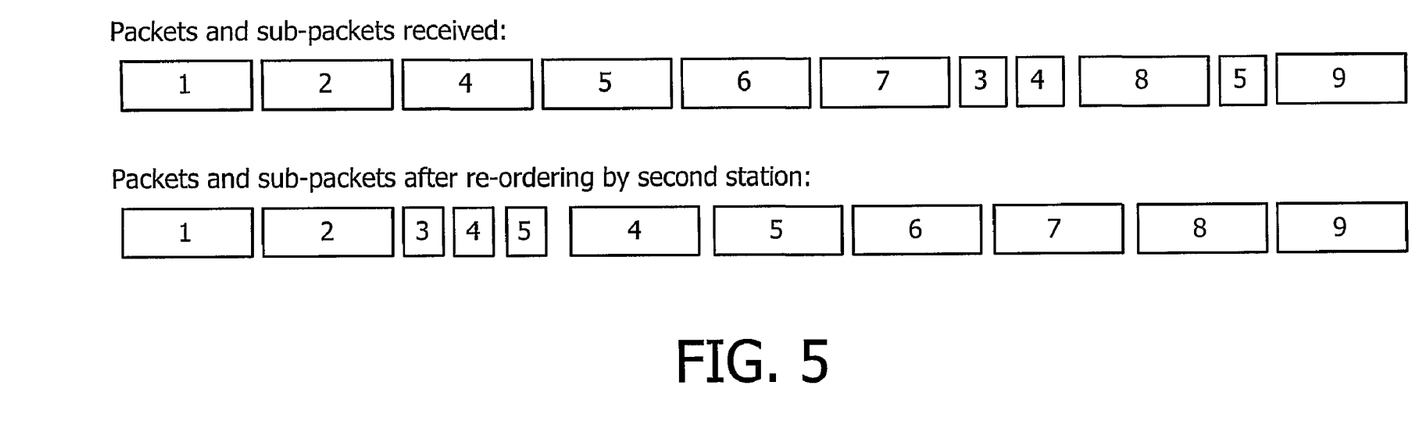
FIG. 5 illustrates sequence numbers and sub-packet indicators in accordance with a first embodiment of the invention.

In a first embodiment, the first sub-packet in the sub-sequence of sub-packets uses the same sequence number, n, as the failed packet from the sequence of packets. The $i^{th}$ sub-packet in the sub-sequence uses the sequence number n+i−1. If the second station has already correctly received the packets with sequence numbers n+1 to n+i−1, the second station assumes that data received with sequence numbers n to n+i−1 are sub-packets of the data from the failed packet n. The second station can therefore re-order the packets and sub-packets as shown in FIG. 5. In FIGS. 5 to 9, the larger boxes represent packets and the smaller boxes represent sub-packets, and the numbers within the boxes represent the sequence numbers and sub-packet indicators. In the example of FIG. 5, the packet containing sequence number 3 failed to be received and the data in it is retransmitted in sub-packets containing the numbers 3, 4 and 5.

However, a problem with this embodiment can arise if the $i^{th}$ sub-packet is received before the packet with sequence number n+i−1. This may occur if there is a pause in the sequence of packets, or if the sequence of packets terminates with no packet ever transmitted with sequence number n+i−1. The second station is then unable to determine whether data received with sequence number n+i−1 is a packet or a sub-packet.

This problem may be overcome by transmitting a dummy packet, e.g. with zero payload, with sequence number n+i−1 before the sub-packet having sequence number n+i−1. The second station then assumes that the first data to be received with sequence number n+i−1 is a packet, and the second data received with that sequence number is a sub-packet. Alternatively, the first station may transmit a special signal to indicate that the packet sequence has terminated or paused, so that the second station will know that subsequent received data comprises sub-packets. Alternatively, the sub-sequence may use sequence numbers with a large negative predetermined offset from the sequence number of the failed packet.

Figure 6:
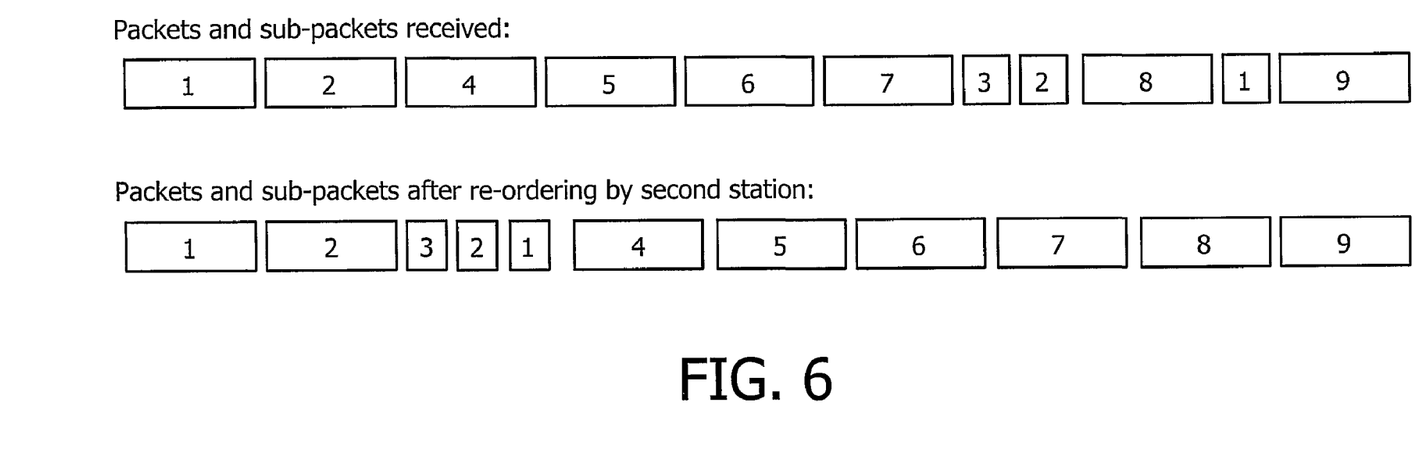
FIG. 6 illustrates sequence numbers and sub-packet indicators in accordance with a second embodiment of the invention.

In a second embodiment, the sub-packets may use the sequence numbers starting from sequence number n of the failed packet, or a starting from the sequence number having a predetermined negative offset from the sequence number of the failed packet, but thereafter decrementing rather than incrementing the sequence number, as shown in FIG. 6. This avoids the potential ambiguity identified above in relation to the second embodiment. In the example of FIG. 6, the packet containing sequence number 3 failed to be received and the data in it is retransmitted in sub-packets containing the numbers 3, 2 and 1.

In order to avoid ambiguities, it is also beneficial to define some additional rules in relation to the second embodiment:

a) The first station shall not use a sequence number for a sub-packet until all transmissions of the packet with that sequence number have finished. For example, with reference to the example illustrated in FIG. 9, the second station receives 1, 2, 3, 6, 4, 7, 8, 9, 4', 5', where the ' symbol is used to indicate a sub-packet (smaller box). Packet having sequence number 5 failed to be received (indicated in FIG. 9 by a shaded box) and is retransmitted using sub-packets containing numbers 4 and 5. The packets and sub-packets are re-ordered to 1, 2, 3, 4, 4', 5', 6, 7, 8, 9. The first station does not re-use sequence numbers 4 and 5 for sub-packet retransmissions of the packet having sequence number 5 until transmission of the packet with sequence number 4 has been completed successfully.

Figure 9:
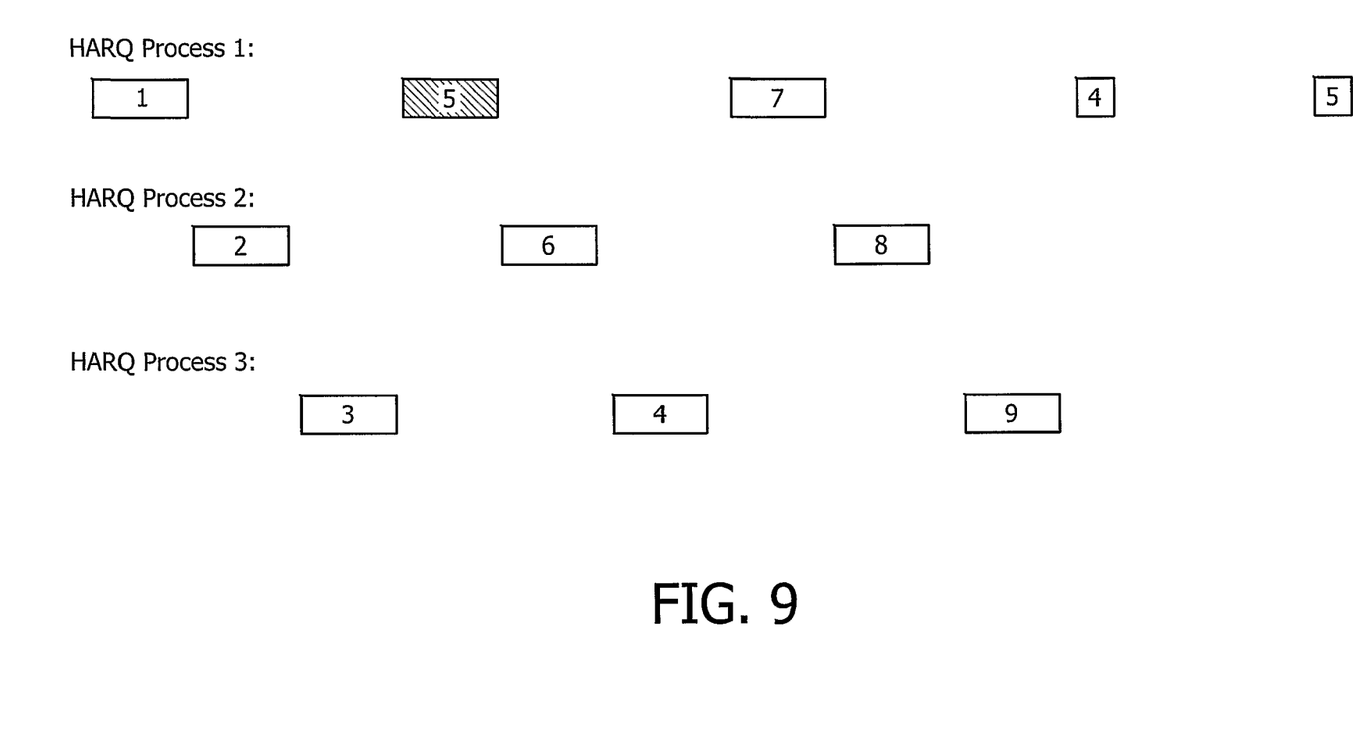
FIG. 9 illustrates additional aspects of the second embodiment of the invention.

If this rule were not obeyed, and the first station transmitted 4' before 4, the second station would erroneously re-order the packets and sub-packets to 1, 2, 3, 4', 4, 5', 6, 7, 8, 9, so that packet 4 ended up inserted between the two sub-packets of the retransmitted packet 5.

b) When a sequence number is re-used for a sub-packet indicator, it is transmitted using a different HARQ process from the HARQ process which was used for the packet with the same number. This enables the second station to distinguish between sub-packets and packets which are simply duplicate retransmissions having the same number.

Duplicate packets may occur if, for example, the second station transmits a positive acknowledgement in response to a physical layer HARQ retransmission of a packet but the first station misinterprets the positive acknowledgement as a negative acknowledgement, where the retransmission was the last permitted physical layer retransmission in that HARQ cycle. In this case, the correctly-decoded packet would be passed up to the MAC layer of the second station. However, the first station might decide to re-start the transmission of the packet using the same sequence number, which could eventually result in a duplicate packet with the same sequence number being passed up to the MAC layer of the second station.

For example, consider the case when the second station receives 1, 2, 3, 3, 4, 5, 6, 7. The second station is unable to determine whether the second data with SN=3 is a duplicate of the first packet with SN=3, in which case the second packet should be discarded and not passed up to higher layers, or whether the second data with SN=3 and the data with SN=4 are sub-packets containing retransmissions of parts of the original packet with SN=4 which was not correctly received, in which case all the packets should be passed up to higher layers in the same order as indicated above.

This problem is avoided if the second station can assume that all data with apparently duplicated sequence numbers which appear on the same HARQ process are duplicates which should be discarded, while data with apparently duplicated sequence numbers which appear on a different HARQ process from the first packet with that sequence number are sub-packets containing retransmissions of parts of another packet and should be reassembled in the corresponding order.

Note that this rule is not applicable when only one HARQ process is used. However, when only one HARQ process is used, if the transmissions of sub-packets of a failed packet with SN=n commence before a packet with SN=n+1 is transmitted, the sub-packets of the failed packet can be numbered n+1, n+2, . . . n+i, and the next packet can then be transmitted with SN=n+i+1. For example, consider the case when the first station transmits packets 1, 2, 3, 4. Packet 4 fails and is not passed up to the MAC layer of the second station. Therefore the first station transmits sub-packets with SNs 4, 5, 6, 7, where each sub-packet contains a quarter of the data from the packet which was originally transmitted with SN=4. The first station then continues by transmitting the next data packet with SN=8, whereas this packet would have used SN=5 if packet 4 had not failed.

Therefore the following rule can be defined for the case of a single HARQ process: All correctly received packets or sub-packets which have a sequence number which is the same as an earlier correctly received packet or sub-packet shall be discarded in the usual way. Note that this does not include the case of the sequence numbers being reused due to wrap-around of the sequence number field after $2^b$ packets where b is the number of bits available for the sequence number.

c) Where multiple packets are aborted and need to be retransmitted in parts, the first station shall always transmit the sub-packets for the earliest aborted packet first, or not at all. A sub-sequence for the packet with SN=m shall not be transmitted after a sub-sequence has started for the packet with SN=n where n>m (except in the case of sequence number wrap-around).

In spite of these rules, some minor ambiguities remain with the second embodiment, although these are not considered serious:

a) If a first PDU is never passed up to the MAC layer, that is the first station never transmits a sub-sequence for it, for example as a result of misinterpreting a negative acknowledgement as a positive acknowledgement, and this is followed shortly afterwards by another PDU for which a sub-sequence is transmitted, and the sub-sequence re-uses sequence numbers from before the first PDU, then the second station will assume that the first few re-used sequence numbers relate to the first PDU.

For example, suppose that the first station sends 1, 2, 3, 4, 5, 6, 2, 3, 4, 5, 7, 8. Errors occur on PDUs 3 and 5, so that these PDUs are not passed up to the MAC layer in the second station. The first station realises that PDU 5 has failed, but not PDU 3, and splits the original PDU5 into 4 sub-packets with sequence numbers 2, 3, 4, 5. The MAC layer in the second station receives 1, 2, 4, 6, 2', 3', 4', 5', 7, 8. It then erroneously re-orders these packets to give 1, 2, 2', 3', 4, 4', 5', 6, 7, 8, whereas the correct order would have been 1, 2, 4, 2', 3', 4', 5', 6, 7, 8.

b) If the PDUs constituting a sub-sequence arrive themselves in the wrong order, the sub-packet indicator can generally be used to resolve the re-ordering, except if the first PDU in the sub-sequence does not arrive first. If the first PDU in the sub-sequence does not arrive first, the second station may be unable to work out to which sub-sequence it belongs, or may have already passed later PDUs up to a higher layer. It is therefore advantageous to further specify that the first and second PDUs of a sub-sequence shall be transmitted using the same HARQ process, so that the first PDU is likely to be received first.

Figure 7:
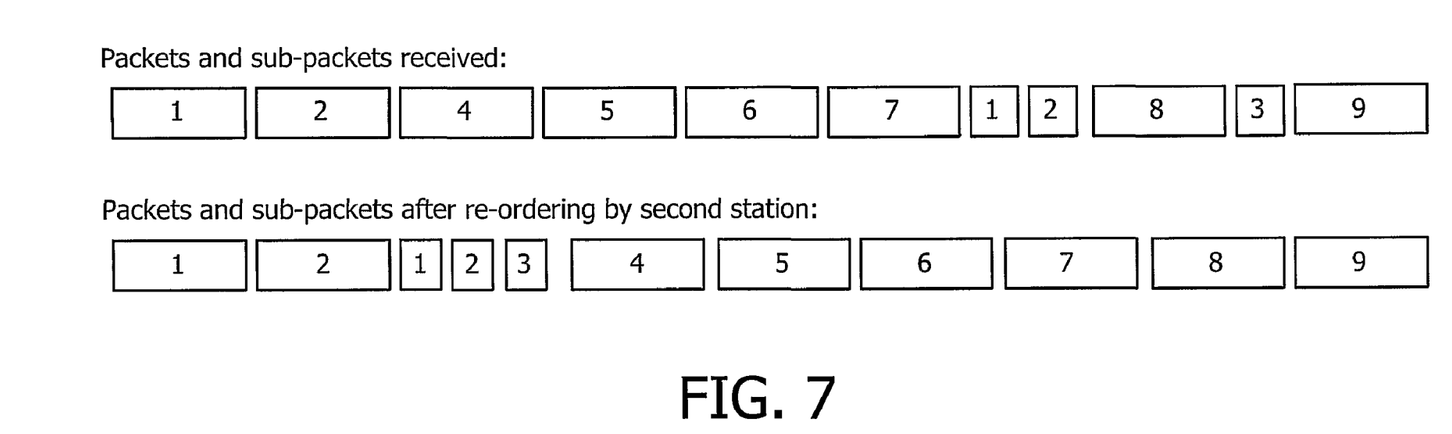
FIG. 7 illustrates sequence numbers and sub-packet indicators in accordance with a third embodiment of the invention.

In a third embodiment consecutive sub-packets use consecutive sequence numbers preceding the sequence number of the data packet to which the sub-packet relates. Expressed mathematically, the $i^{th}$ sub-packet in a sub-sequence comprises sequence number n−p+i, where p is the number of sub-packets, as shown in FIG. 7. Therefore, the first sub-packet uses sequence number n−(p−1), and the final, $p^{th}$ sub-packet uses sequence number n. In the example of FIG. 7, the packet containing sequence number 3 failed to be received and the data in it is retransmitted in sub-packets containing the numbers 1, 2 and 3. Alternatively, the consecutive sub-packets may use consecutive sequence numbers in the same order as used in the data packets and terminating with the sequence number having a predetermined negative offset from the sequence number of the data packet being retransmitted.

The third embodiment has the advantage that it enables the second station to determine how many sub-packets the sub-sequence comprises and therefore when the sub-sequence has terminated. This is particularly useful if the MAC layer in the second station passes the re-ordered packets up to a higher layer, as it enables the second station to determine when to pass the packet with sequence number n+1 up to the higher layer. In the example of FIG. 7, after the receipt of sub-packet numbered 3, the second station knows that it can now pass the packet with sequence number 4 up to the higher layer.

Figure 8:
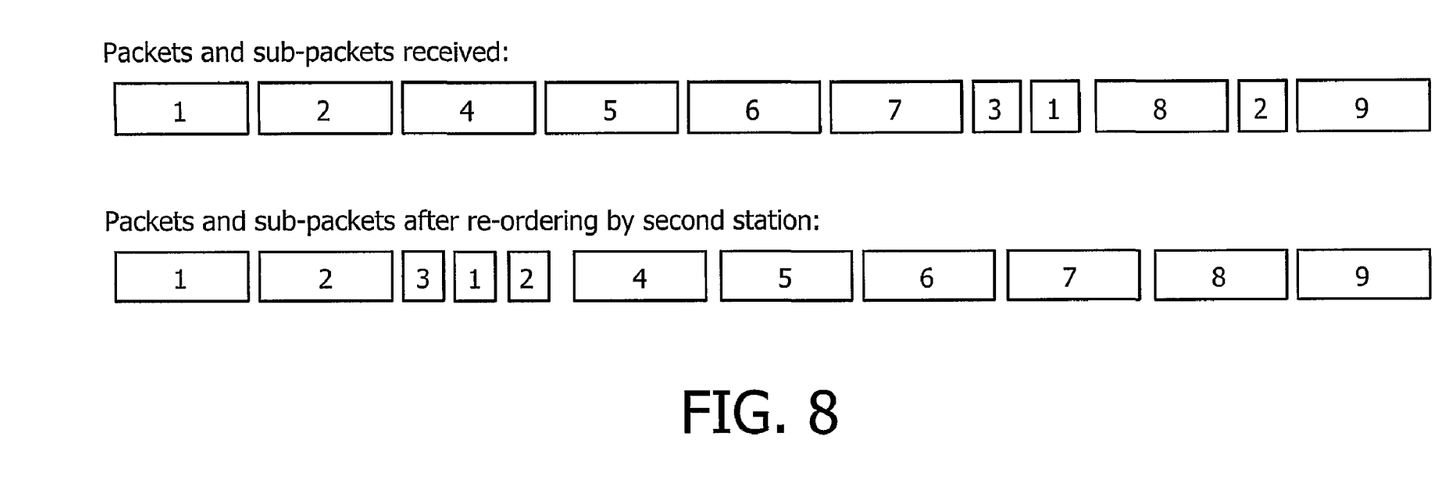
FIG. 8 illustrates sequence numbers and sub-packet indicators in accordance with a fourth embodiment of the invention.

In a fourth embodiment, the first sub-packet of the sub-sequence uses sequence number n of the data packet to which the sub-packet relates, and the $i^{th}$ sub-packet, i>1, uses sequence number n−p+i−1, as shown in FIG. 8. In the example of FIG. 8, the packet containing sequence number 3 failed to be received and the data in it is retransmitted in sub-packets containing the numbers 3, 1, and 2. This fourth embodiment has the advantage that it enables the second station to determine, immediately on receipt of the first sub-packet, to which packet the sub-sequence relates, and also to determine how many sub-packets the sub-sequence comprises and therefore when the sub-sequence has terminated. Alternatively, the first sub-packet of the sub-sequence uses the sequence number having a predetermined negative offset from the sequence number of the data packet being retransmitted, and the following sub-packets use the sequence numbers preceding said offset sequence number, using these in the same order as the order of use of the sequence numbers of the data packets.

In those embodiment that use for the sub-packets a sequence number involving a predetermined negative offset from the sequence number of the data packet being retransmitted, the second station, when determining which packet the retransmission corresponds to, and the order of the sub-packets, adds the magnitude of the offset to the value of the received sub-packet indicator if a data packet having the same sequence number as the received sub-packet indicator has already been received. The size of the predetermined negative offset may be signalled from one of the first and second stations to the other.

Although the invention has been described in terms of sequence numbers at the MAC layer, the invention may also be applied to sequence numbers used at higher layers than the MAC, for example the RLC (Radio Link Control) level.

Optionally, sub-packets can themselves be divided into sub-sub-packets and the same principles of the invention applied to the sub-packets and sub-sub-packets as have been described for the packets and sub-packets.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of data communication and which may be used instead of or in addition to features already described herein.

The invention claimed is:

1. A method of transmitting data from a first station to a second station, comprising:
   at the first station, dividing the data into a sequence of data packets and transmitting the sequence of data packets;
   at the second station, receiving the data packets and transmitting acknowledgements indicating whether the data packets have been received successfully;
   at the first station, retransmitting as a sub-sequence of a plurality of sub-packets a data packet which has not been received successfully;
   at the second station, reconstituting the data from the data packets and sub-packets;
   wherein the data packets comprise a sequence number providing an indication of position of each data packet within the sequence of data packets, the sub-packets comprise a sub-packet indicator providing an indication of position of each sub-packet within the sub-sequence of sub-packets, the sequence numbers and sub-packet indicators include a plurality of numbers in common, and the first station transmits a dummy packet before transmitting a sub-packet of the sub-sequence of the plurality of sub-packets, the dummy packet having a dummy sequence number same as the sub-packet indicator of the sub-packet of the sub-sequence of the plurality of sub-packets which is transmitted thereafter.

2. A method as claimed in claim 1, wherein the sub-packet indicator comprises, in consecutive sub-packets, consecutive sequence numbers commencing with the sequence number of the data packet being retransmitted and followed by subsequent sequence numbers.

3. A method as claimed in claim 1, wherein the sub-packet indicator comprises, in consecutive sub-packets, consecutive sequence numbers commencing with a sequence number having a predetermined negative offset from the sequence number of the data packet being retransmitted and followed by subsequent sequence numbers.

4. A method as claimed in claim 2, wherein the sub-packet comprises no further indication of its position relative to the other data packets.

5. A method as claimed in claim 1, wherein the sub-packet indicator comprises, in consecutive sub-packets, consecutive sequence numbers commencing with the sequence number of the packet being retransmitted and followed by preceding sequence numbers in reverse order of use compared with the sequence numbers in the data packets.

6. A method as claimed in claim 1, wherein the sub-packet indicator comprises, in consecutive sub-packets, consecutive sequence numbers commencing with a sequence number having a predetermined negative offset from the sequence number of the packet being retransmitted and followed by sequence numbers preceding the offset sequence number in reverse order of use compared with the sequence numbers in the data packets.

7. A method as claimed in claim 1, wherein the sub-packet indicator comprises, in consecutive sub-packets, consecutive sequence numbers in the same order as used in the data packets and terminating with the sequence number of the data packet being retransmitted.

8. A method as claimed in claim 1, wherein the sub-packet indicator comprises, in consecutive sub-packets, consecutive sequence numbers in the same order as used in the data packets and terminating with a sequence number having a predetermined negative offset from the sequence number of the data packet being retransmitted.

9. A method as claimed in claim 1, wherein the sub-packet indicator comprises, in the first sub-packet the sequence number of the data packet being retransmitted, and in following sub-packets, preceding sequence numbers in the same order of use as the sequence numbers in the data packets.

10. A method as claimed in claim 1, wherein the sub-packet indicator comprises, in the first sub-packet a sequence number having a predetermined negative offset from the sequence number of the data packet being retransmitted, and in following sub-packets, sequence numbers preceding the offset sequence number in the same order of use as the sequence numbers in the data packets.

11. A first station for transmitting data to a second station, the first station comprising:

means for dividing the data into a sequence of data packets, each data packet including a sequence number providing an indication of position of the data packet within the sequence of data packets;

means for transmitting each data packet in turn;

means for receiving an acknowledgement from the second station indicating whether the transmitted data packet has been received successfully;

means responsive to receiving an acknowledgement indicating that the transmitted data packet has not been received successfully, for dividing the unsuccessful data packet into a sub-sequence of sub-packets, each sub-packet including a sub-packet indicator providing an indication of position of the sub-packet within the sub-sequence, wherein the sequence numbers and the sub-packet indicators include a plurality of numbers in common;

means for transmitting a dummy packet before a sub-packet of the subsequence of the plurality of sub-packets; and means for transmitting each sub-packet in turn, wherein the dummy packet has a dummy sequence number same as the sub-packet indicator of the sub-packet of the sub-sequence of the plurality of sub-packets which is transmitted thereafter.

12. A system for communicating data from a first station to a second station, the system comprising a first station as claimed in claim 11 and a second station having:

means for receiving data packets, sub-packets and dummy packets;

means for decoding the received data packets and sub-packets;

means for generating acknowledgements indicative of whether the received data packets and sub-packets have been received successfully;

means for transmitting the acknowledgements; and means for employing sequence numbers of the data packets and sub-packet indicators of the sub-packets to reconstitute the data, wherein a dummy packet is transmitted by the first station before a sub-packet of the sub-sequence of the plurality of sub-packets and wherein the dummy packet has a dummy sequence number same as the sub-packet indicator of the sub-packet of the sub-sequence of the plurality of sub-packets which is transmitted thereafter.

* * * * *